(12) United States Patent
Yokochi

(10) Patent No.: US 8,537,432 B2
(45) Date of Patent: Sep. 17, 2013

(54) IMAGE-READER INITIALIZING SETTING OF IMAGE PROCESS

(75) Inventor: Atsushi Yokochi, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 234 days.

(21) Appl. No.: 13/073,467

(22) Filed: Mar. 28, 2011

(65) Prior Publication Data

US 2011/0242625 A1    Oct. 6, 2011

(30) Foreign Application Priority Data

Mar. 30, 2010    (JP) .................................. 2010-078664

(51) Int. Cl.
*H04N 1/04*    (2006.01)

(52) U.S. Cl.
USPC ........... 358/474; 358/498; 358/513; 358/514; 382/261; 399/97

(58) Field of Classification Search
USPC ................ 358/474, 498, 513, 514, 1.16, 488, 358/448, 475, 44, 483; 382/261; 399/97
See application file for complete search history.

(56) References Cited

U.S. PATENT DOCUMENTS

| | | | | |
|---|---|---|---|---|
| 6,122,077 A * | 9/2000 | Kaji | ............................... | 358/448 |
| 7,502,147 B2 * | 3/2009 | Suzuki et al. | .................. | 358/504 |
| 7,782,498 B2 * | 8/2010 | Hoshi | ........................... | 358/474 |
| 7,813,005 B2 * | 10/2010 | Arai | ................................ | 358/2.1 |
| 7,924,475 B2 * | 4/2011 | Suzuki | .......................... | 358/474 |
| 8,159,731 B2 * | 4/2012 | Sato et al. | ..................... | 358/497 |
| 8,189,214 B2 * | 5/2012 | Ishii | ............................. | 358/1.14 |
| 8,194,297 B2 * | 6/2012 | Ishikawa | ....................... | 358/514 |
| 8,284,465 B2 * | 10/2012 | Ishikawa | ....................... | 358/498 |
| 8,305,657 B2 * | 11/2012 | Shimizu et al. | ............... | 358/498 |

FOREIGN PATENT DOCUMENTS

| | | |
|---|---|---|
| JP | H8-265576 | 10/1996 |
| JP | 11-308471 | 11/1999 |
| JP | 2001-8088 | 1/2001 |
| JP | 2005-025072 | 1/2005 |
| JP | 2007-166229 | 6/2007 |
| JP | 2007-274449 | 10/2007 |
| JP | 2007-281718 | 10/2007 |
| JP | 2009-065371 | 3/2009 |

* cited by examiner

*Primary Examiner* — Negussie Worku
(74) *Attorney, Agent, or Firm* — Scully, Scott, Murphy & Presser, PC

(57) ABSTRACT

In an image reader, the first reading unit outputs first image data corresponding to the image of the first surface of the original document. The second image reading unit outputs second image data corresponding to the image of the second surface of the original document. The image process circuit acquires at least one of a part of the first image data and a part of the second image data from the storing unit, and performs an image process on the image data acquired from the storing unit. When the image process circuit finishes performing the image process on either the first image data or the second image data, the initialization instruction unit instructs initializing either the first setting or the second setting corresponding to the either the first image data or the second image data and the image process circuit initializes the either the first setting or the second setting.

6 Claims, 7 Drawing Sheets

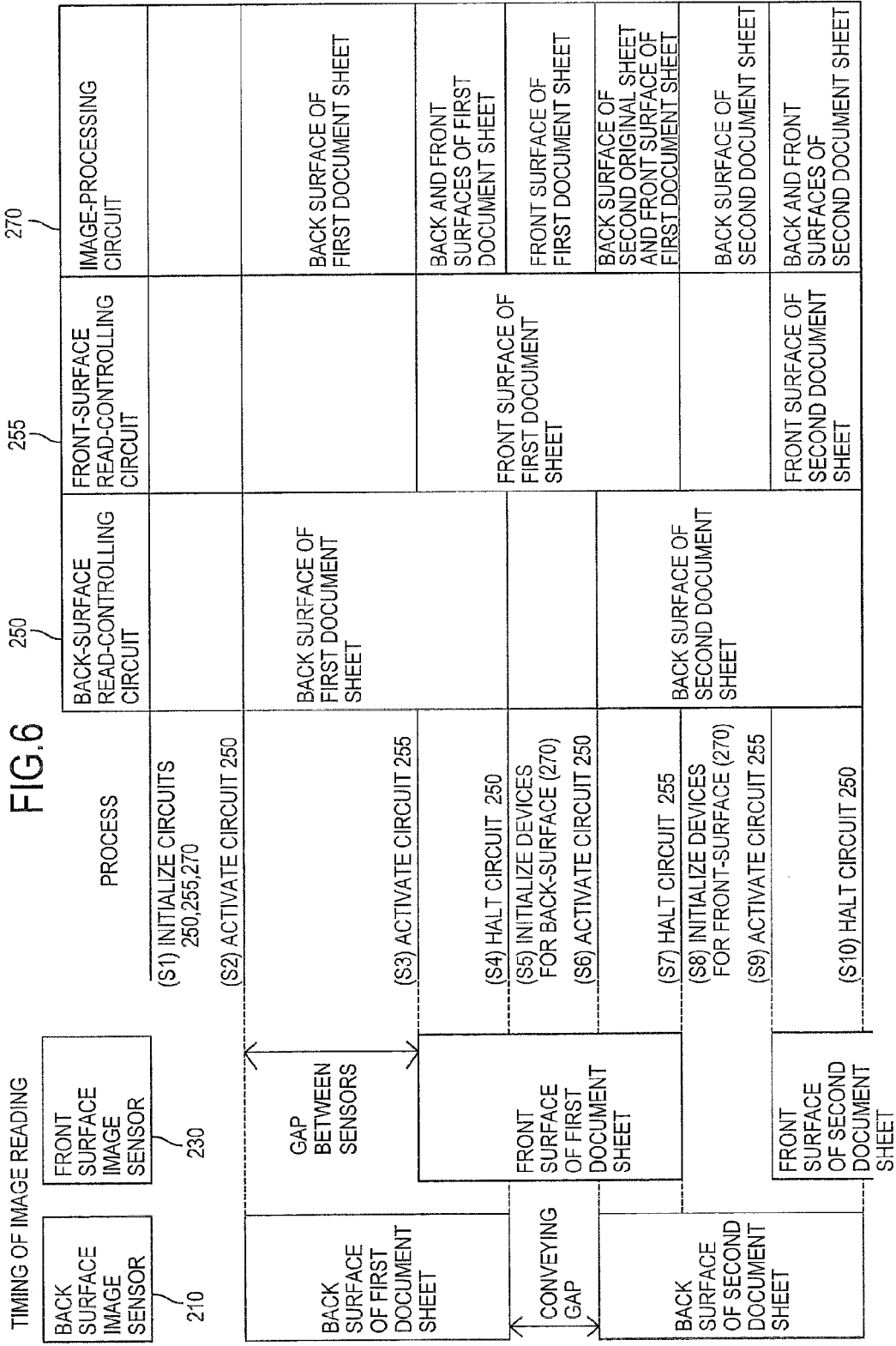

IMAGE-READER INITIALIZING SETTING OF IMAGE PROCESS

CROSS REFERENCE TO RELATED APPLICATION

This application claims priority from Japanese Patent Application No. 2010-078664 filed Mar. 30, 2010. The entire content of the priority application is incorporated herein by reference.

TECHNICAL FIELD

The invention relates to an image-reader having two image-reading sensors for simultaneously reading both sides of a document sheet, and a single image-processing circuit for processing the image data read by the sensors.

BACKGROUND

A conventional image-reader known in the art is provided with two image-reading sensors disposed on a path along which an document sheet is conveyed. One image-reading sensor is provided for the front surface of the document sheet, and the other for the back surface of the document sheet, whereby the two image-reading sensors can simultaneously read both surfaces of an document sheet conveyed along the conveying path.

Japanese patent application publication No. H8-265576 describes an information processor having two image-reading sensors corresponding to both surfaces of an document sheet, and a single signal processing circuit. The signal processing circuit performs image processes on image signals received from the image-reading sensors, while alternating between the two image signals, in order to generate image data for both surfaces of the document sheet.

SUMMARY

It is an object of the invention to provide an image-reader capable of quickly reading images from both surfaces of a plurality of document sheets using to two image-reading sensors and one image processor.

In order to attain the above and other objects, the invention provides an image-reader. The image-reader includes a conveyance unit, a first reading unit, a second reading unit, a storing unit, an image process circuit, and an initialization instruction unit. The conveyance unit is configured to sequentially convey a plurality of document sheets at a predetermined interval along a conveying path. Each document sheet includes a first surface and a second surface. The first reading unit is configured to read an image on a first surface of a document sheet being conveyed on the conveying path and output first image data corresponding to the read image of the first surface. The second reading unit is disposed on the conveying path apart from the first image reading unit. The second image reading unit is configured to read an image on a second surface of the document sheet being conveyed on the conveying path and output second image data corresponding to the read image of the second surface. The storing unit is configured to store the first image data output from the first reading unit and the second image data output from the second reading unit. The image process circuit is configured to acquire at least one of a part of the first image data and a part of the second image data from the storing unit, and to perform an image process on the image data acquired from the storing unit. The image process circuit has a first setting corresponding to setting of the image process circuit for the first surface and a second setting corresponding to setting of the image process for the second surface. When the image process circuit finishes performing the image process on either the first image data or the second image data, the initialization instruction unit instructs initializing either the first setting or the second setting corresponding to the either the first image data or the second image data. When the initialization instruction unit instructs initializing the either the first setting or the second setting, the image process circuit initializes the either the first setting or the second setting.

BRIEF DESCRIPTION OF THE DRAWINGS

The particular features and advantages of the invention as well as other objects will become apparent from the following description taken in connection with the accompanying drawings, in which:

FIG. 5($b$) is a block diagram illustrating a structure of an error computing unit;

FIG. 6 is a timing chart illustrating of a scanning operation; and

DETAILED DESCRIPTION

An image-reader 10 according to an embodiment of the invention will be described while referring to the accompanying drawings.

Structural Descriptions (1) Overall Structure of an Image-Reader

The image-reader 10 of the embodiment constitutes part of a scanner, and a copier.

Figure 1:
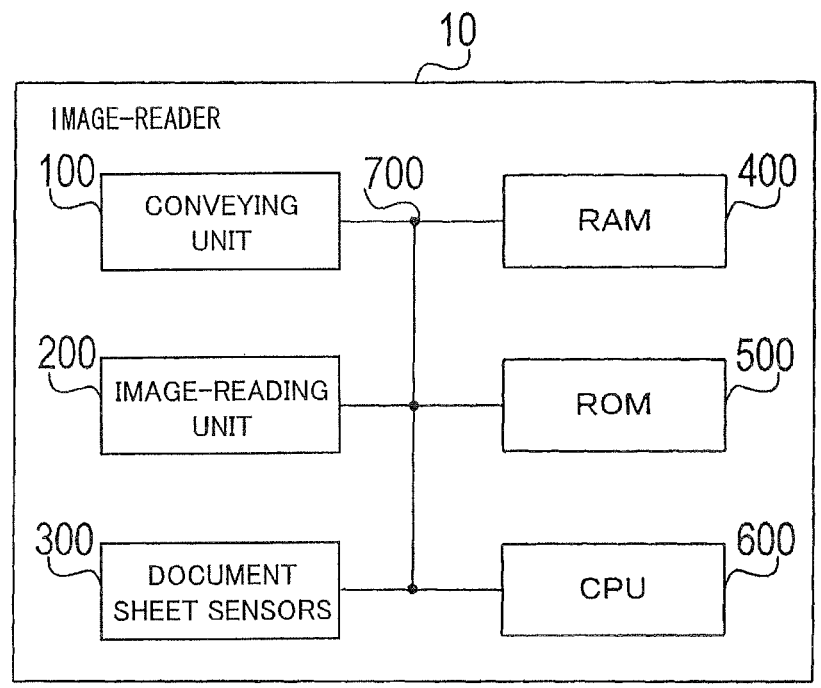
FIG. 1 is a block diagram showing a structure of an image-reader according to an embodiment.

FIG. 1 is a block diagram showing the structure of the image-reader 10. The image-reader 10 includes a conveying unit 100, an image-reading unit 200, document sheet sensors 300, a RAM 400, a ROM 500, and a CPU 600. All of these components are interconnected via an internal bus 700.

[日本 0022]

The conveying unit 100 is integrally provided with a cover 30 (see FIG. 2) of the image-reader 10. The conveying unit 100 (the cover 30) functions as an automatic document feeder (ADF) for conveying document sheets placed in a feeding tray along a conveying path. The image-reading unit 200 is capable of reading images simultaneously from both front and back surfaces of an document sheet conveyed along the conveying path. The document sheet sensors 300 detect the document sheet on the conveying path. The RAM 400 and the ROM 500 store various data and programs. The CPU 600 executes various processes based on the programs stored in the ROM 500 to control overall operations of the image-reader 10.

Figure 2:
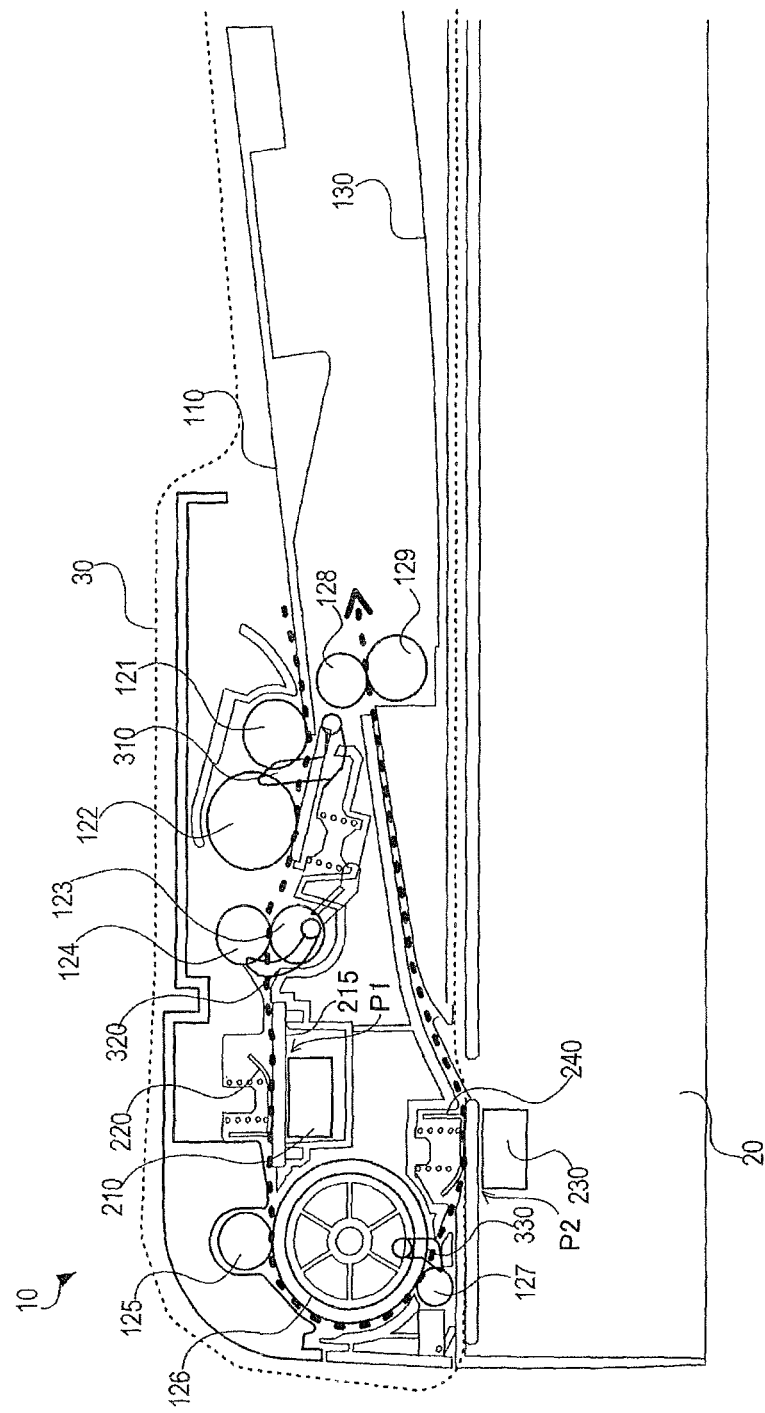
FIG. 2 is an explanatory diagram conceptually illustrating an document sheet cover in a partial cross-sectional view.

As shown in FIG. 2, the image-reader 10 has the original support base 20, and an document sheet cover 30. The document sheet support base 20 functions as a flatbed scanner. The cover 30 is attached by hinges (not shown) to the original support base 20. The cover 30 can be rotated open and closed on the original support base 20 via the hinges (not shown).

The conveying unit 100 is built inside the document sheet cover 30. Here, the structure of the document sheet cover 30 will be described in greater detail with reference to the explanatory diagram of FIG. 2.

The document sheet cover 30 includes a feeding tray 110 that holds an document sheet to be read, and a catch tray 130 for receiving document sheets that have been read. The conveying unit 100 includes conveying rollers 121-129 for conveying the document sheets from the feeding tray 110 to the catch tray 130 along a conveying path indicated by a bold dotted line in FIG. 2.

The document sheet cover 30 includes a back surface image sensor 210, a document sheet pressing piece 220, a front surface image sensor 230, and a document sheet pressing piece 240. An upstream reading position P1 and a downstream reading position P2 are established on the conveying path. The back surface image sensor 210 for reading images from the back surface of an document sheet is disposed at the upstream reading position P1. The document sheet pressing piece 220 is provided for pressing the document sheet against the reading surface of the back surface image sensor 210 as the document sheet is conveyed through the upstream reading position P1. The front surface image sensor 230 for reading images from the front surface of an document sheet is movably disposed on the original support base 20 so as to be movable to the downstream reading position P2. The document sheet pressing piece 240 is provided for pressing an document sheet against the reading surface of the front surface image sensor 230 as the document sheet is conveyed through the downstream reading position P2. The conveying unit 100 sequentially conveys the document sheets at a fixed interval, for example. The CPU 600 sets this fixed interval before the reading process is started.

An F sensor 310, an RB sensor 320, and an R sensor 330 are provided along the conveying path as the document sheet sensors 300 for detecting the presence of an document sheet being conveyed through the positions of the corresponding sensors.

(2) Structure of the Image-Reading Unit

Figure 3:
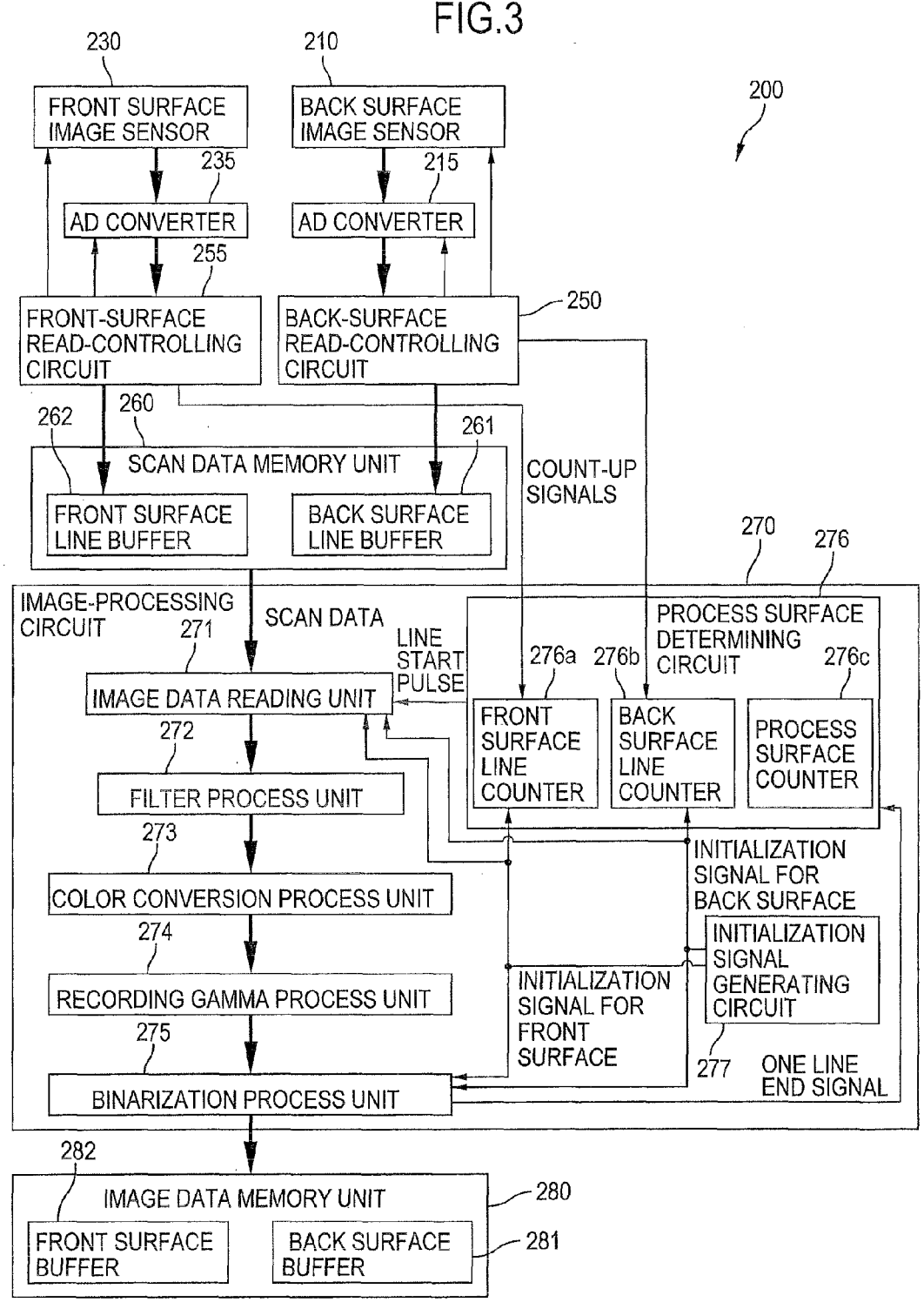
FIG. 3 is a block diagram illustrating a structure of an image-reading unit.

Next, the structure of the image-reading unit 200 provided in the image-reader 10 will be described with reference to the block diagram in FIG. 3.

As described above, the image-reading unit 200 has the back surface image sensor 210, and the front surface image sensor 230. The back surface image sensor 210 reads images from the back surface of an document sheet in units of lines (in a line basis) extending in a main scanning direction and outputs a analog image signal correspond to read image of the back surface, while the front surface image sensor 230 performs the same process for the front surface of the document sheet. The image-reading unit 200 further includes an AD converter 215 and a back-surface read-controlling circuit 250. The AD converter 215 quantizes the image signal outputted from the back surface image sensor 210 and generates scan data in units of lines in the form of multilevel digital image data. The back-surface read-controlling circuit 250 controls the back surface image sensor 210 and the AD converter 215. The back-surface read-controlling circuit 250 performs various correction processes on the scan data generated by the AD converter 215. The image-reading unit 200 includes an AD converter 235 and a front-surface read-controlling circuit 255 for the front surface image sensor 230. The AD converter 235 and the front-surface read-controlling circuit 255 execute processes similarly to the AD converter 215 and the back-surface read-controlling circuit 250, respectively.

The image-reading unit 200 also includes a scan data memory unit 260, an image-processing circuit 270, and an image data memory unit 280. The back-surface read-controlling circuit 250 and the front-surface read-controlling circuit 255 write scan data to the scan data memory unit 260 in units of lines. The image-processing circuit 270 reads scan data from the scan data memory unit 260, performs various image processes on the scan data, and stores the processed scan data in the image data memory unit 280.

The scan data memory unit 260 has a back surface line buffer 261, and a front surface line buffer 262, each of which is configured of a ring buffer. The back-surface read-controlling circuit 250 writes scan data in units of lines to the back surface line buffer 261, while the front-surface read-controlling circuit 255 writes scan data in units of lines to the front surface line buffer 262. Alternatively, the scan data memory unit 260 may be configured as part of the RAM 400.

The image data memory unit 280 has a back surface buffer 281 and a front surface buffer 282. The back surface buffer 281 stores the processed scan data of the back surface of the document sheet. The front surface buffer 282 stores the processed scan data of the front surface of the document sheet.

(3) Structure of the Image-Processing Circuit

Next, the structure of the image-processing circuit 270 will be described with reference to the block diagram in FIG. 3.

The image-processing circuit 270 includes an image data reading unit 271, a filter process unit 272, a color conversion process unit 273, a recording gamma process unit 274, a binarization process unit 275, a process surface determining circuit 276, and an initialization signal generating circuit 277.

The image data reading unit 271 performs processes to read scan data for each surface of an document sheet from the scan data memory unit 260 in units of lines (in a line basis), (that is, the image data reading unit 271 reads a target line data set from the scan data memory unit 260) and to enlarge or reduce the size of the scanned image. To implement the image processes of the image-processing circuit 270, the filter process unit 272 performs noise filtration, edge detection, smoothing, and other filtering processes in a line basis. Specifically, the filter process unit 272 performs filter processes on a target line (the target line data set) by using a prescribed number of lines worth of scan data read by the image data reading unit 271. For example, the prescribed numbers of lines are five lines including the target line and four lines adjacent to the target line (two lines previous to the target line and two lines subsequent to the target line). So, the image data reading unit 271 also reads scan data for the prescribed number of lines to perform the filter processes. The color conversion process unit 273 performs a color conversion process to change the method of color representation on the target line data. The recording gamma process unit 274 performs gamma correction on the scan data to set suitable densities for printing the scanned image on recording paper. The binarization process unit 275 performs a binarization process, such as an error diffusion process or dither process, on the scan data in units of lines (that is, the target line data set) and stores the resulting binary data in the image data memory unit 280. The binarization process unit 275 signal transmits a one-line end signal to the process surface determining circuit 276 each time the binalization process unit 275 ends the binalization process on scan data for one line (the target line data). The process surface determining circuit 276 transfers the one-line end signal to the CPU 600.

The process surface determining circuit 276 determines which process surface of the document sheet is the target of a read process by the image data reading unit 271. Specifically, the process surface determining circuit 276 includes a front surface line counter 276a, a back surface line counter 276b, and a process surface counter 276c. The front surface line counter 276a indicates the number of lines of scan data. The back surface line counter 276b similarly indicates the number of lines of scan data. The process surface counter 276c determines the process surface of the document sheets based on the number of lines indicated by the front surface line counter 276a and the number of lines indicated by the back surface line counter 276b and outputs a process surface flag indicating the process surface.

When writing one line worth of scan data to the back surface line buffer 261, the back-surface read-controlling circuit 250 also outputs a count-up signal to the back surface line counter 276b, whereby the number of lines indicated by the back surface line counter 276b is incremented by one. Similarly, when writing one line worth of scan data to the front surface line buffer 262, the front-surface read-controlling circuit 255 also outputs a count-up signal to the front surface line counter 276a, whereby the number of lines indicated by the front surface line counter 276a is incremented by one.

Further, when performing a reading process for the front surface or the back surface of the document sheet, the image data reading unit 271 outputs a count-down signal (not shown) to the corresponding line counter (the front surface line counter 276a or the back surface line counter 276b) in the process surface determining circuit 276, whereby the number of lines indicated by the corresponding line counter is decremented by one. That is, the front surface line counter 276a indicates the number of lines of scan data that is stored in the front surface line buffer 262 and that is not read by the image reading unit 271. Similarly, the back surface line counter 276b indicates the number of lines of scan data that is stored in the back surface line buffer 261 and that is not read by the image reading unit 271.

The CPU 600 determines that the scanning process for each surface of an document sheet is complete and that a scanning operation for the corresponding surface of a new sheet is to begin based on the detection results for the presence of a sheet received from the F sensor 310, the RB sensor 320, and the R sensor 330. The CPU 600 also determines the image processes by the image-processing circuit 270 is complete for each surface of a document sheet. When the CPU 600 determines that a scanning operation and image processes have ended for a surface of the current sheet and that a next scanning operation is about to begin for the same surface of a new sheet, the CPU 600 controls the initialization signal generating circuit 277 to output an initialization signal to the image data reading unit 271, the binarization process unit 275, and the corresponding line counter (276a or 7276b) instructing that settings for the reading process and image processes be initialized for the corresponding surface of the document sheet.

(4) Structure of the Image Data Reading Unit

Figure 4:
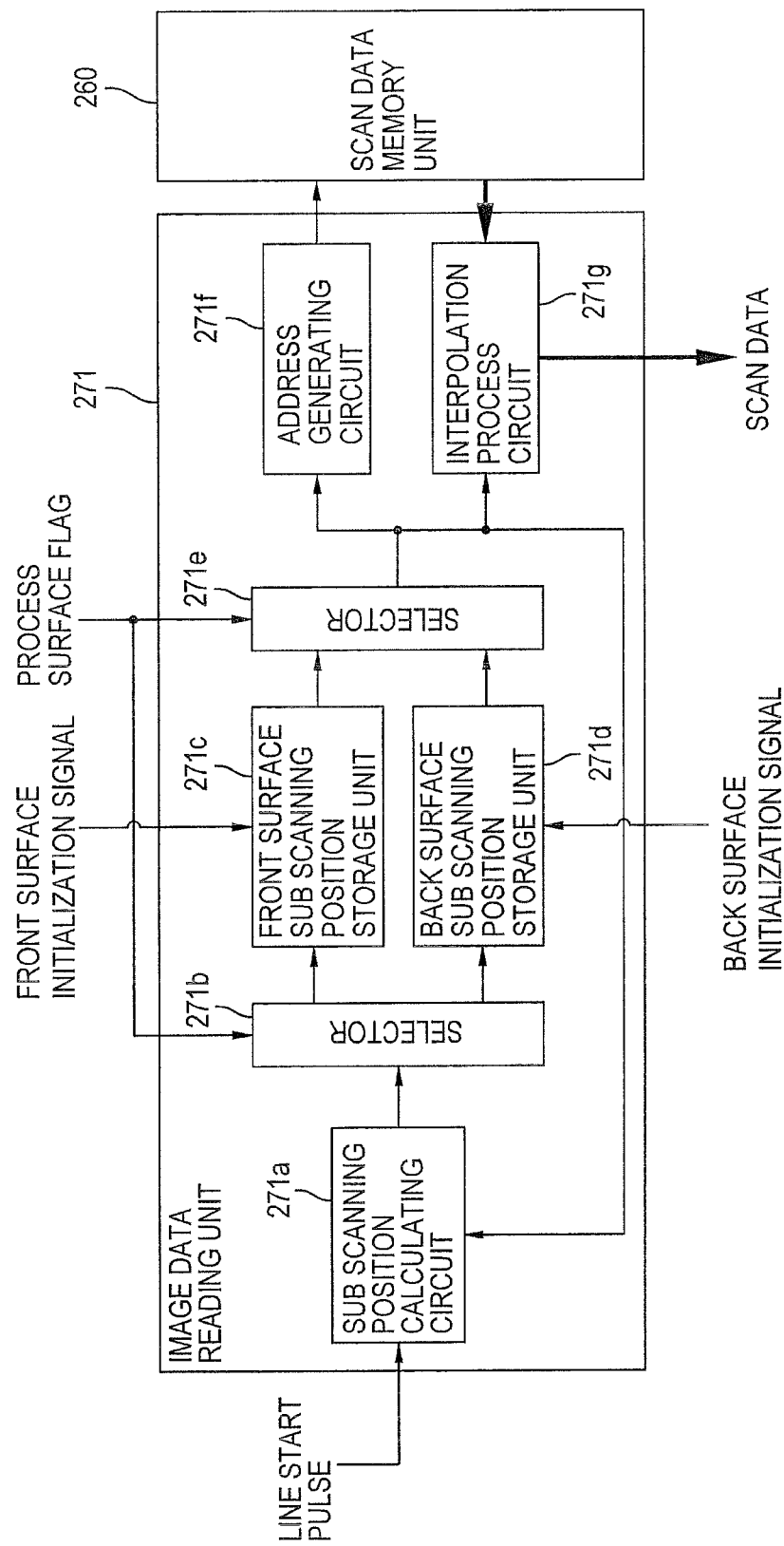
FIG. 4 is a block diagram illustrating a structure of an image data reading unit.

Next, the structure of the image data reading unit 271 will be described with reference to the block diagram in FIG. 4. As described above, the image data reading unit 271 performs a reading process to read scan data from the scan data memory unit 260 and to enlarge or reduce the scanned image. The process to enlarge a scanned image is achieved by redundantly reading each line of the scan data in the reading process at a ratio corresponding to the enlargement ratio and performing an interpolation process on this scan data. The process to reduce the scanned image is achieved by skipping lines of the scan data in the reading process by intervals based on a reduction ratio and performing an interpolation process on this scan data.

Specifically, the image data reading unit 271 includes a sub scanning position calculating circuit 271a, selectors 271b and 271e, a front surface sub scanning position storage unit 271c, a back surface sub scanning position storage unit 271d, an address generating circuit 271f, and an interpolation process circuit 271g.

When the image process for one line is ended, (i.e., when a next reading process to read scan data for a line (a line data set) from the line buffer will be started), the process surface determining circuit 276 sends a line start pulse to the sub scanning position calculating circuit 721a instructing the start of a reading process for a line on a surface of the document sheet. When a line start pulse is inputted into the sub scanning position calculating circuit 271a from the process surface determining circuit 276, the sub scanning position calculating circuit 271a calculates sub scanning position data specifying the position of the current line to be targeted for the reading process based on the enlargement ratio or reduction ratio for the scanned image and based on the sub scanning position storage unit (271c or 271d) that is selected by the selector 271e. After calculating new sub scanning position data for a surface of the original, the sub scanning position calculating circuit 271a generates a count-down signal corresponding to the difference between the new sub scanning position data and the previous sub scanning position data and outputs this count-down signal to the line counter for the corresponding surface of the document sheet.

The front surface sub scanning position storage unit 271c stores the sub scanning position data for the front surface of the document sheet and receives a front surface initialization signal inputted from the initialization signal generating circuit 277. The back surface sub scanning position storage unit 271d stores the sub scanning position data for the back surface of the document sheet and receives a back surface initialization signal inputted from the initialization signal generating circuit 277. Upon receiving an inputted initialization signal, the corresponding sub scanning position storage unit (271c or 271d) initializes settings for the reading process by setting the sub scanning position data stored therein to a value "0" corresponding to the top line on the corresponding surface of the document sheet. In this case, after the sub scanning position calculating circuit 271a calculates the sub scanning position (for example, increments the sub scanning position by "1"), the sub scanning position does not indicate a top line. So, the image reading unit does not reads the scan data for the top line (a line data set corresponding to the top line). However, this causes no problems because the image data reading unit 271 enlarges or reduces the size of the scanned image and the image data reading unit 271 needs not to read the scan data for the top line. Alternatively, the sub scanning position storage unit (271 or 271d) may initialize settings for the reading process by setting the sub scanning position data to a value (for example, "−1") such that after the sub scanning position calculating circuit 271a calculates sub scanning position (for example, increments the sub scanning position by "1"), the calculated sub scanning position indicates the position of the top line.

The selector 271b updates the sub scanning position data calculated by the sub scanning position calculating circuit 271a to the sub scanning position storage unit (217c or 271d) corresponding to the process surface flag outputted from the process surface determining circuit 276.

The selector 271e selects the sub scanning position storage unit (271c or 271d) corresponding to the process surface flag outputted from the process surface determining circuit 276 and outputs the sub scanning position data stored in the selected sub scanning position storage unit (271c or 271d) to the address generating circuit 271f and interpolation process circuit 271g, described later, as well as to the sub scanning position calculating circuit 271a.

The address generating circuit 271f calculates the address in the scan data memory unit 260 storing scan data corresponding to the sub scanning position data inputted from the selector 271e and outputs this address to the scan data memory unit 260.

The interpolation process circuit 271g acquires the scan data stored at the above address from the scan data memory unit 260, performs an interpolation process on the scan data based on the enlargement ratio or reduction ratio, and outputs the result of the interpolation process to the filter process unit 272.

(5) Structure of an Error Diffusion Process Unit

Figure 5A:
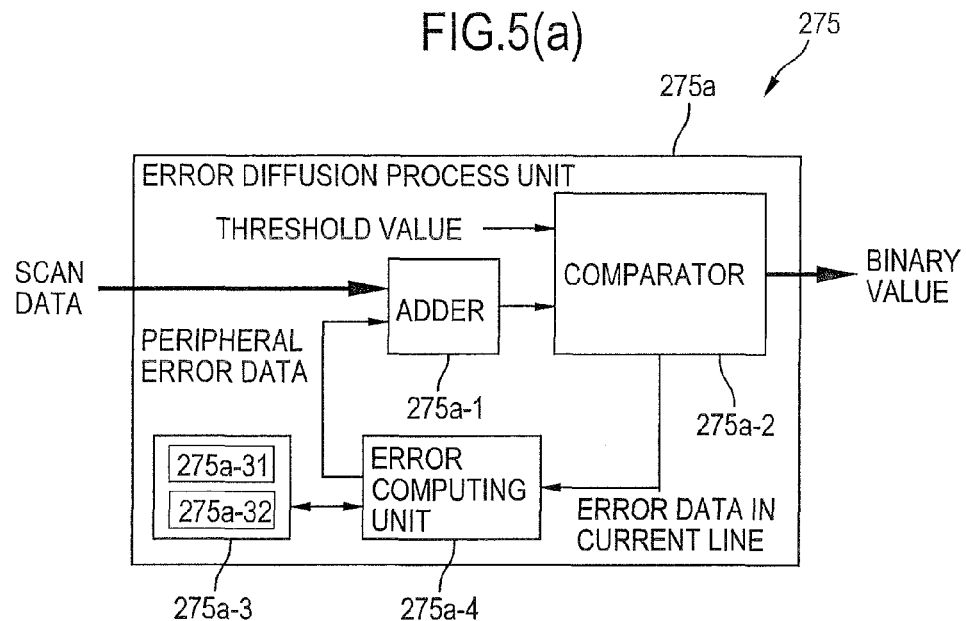
FIG. 5($a$) is a block diagram illustrating a structure of an error diffusion process unit.

As described above, the binarization process unit 275 performs a binarization process on scan data configured of multilevel image data according to an error diffusion process. As shown in FIG. 5(a), an error diffusion process unit 275a is provided in the binarization process unit 275 for performing an error diffusion process.

The error diffusion process unit 275a has an adder 275a-1, a comparator 275a-2, an error memory unit 275a-3, and an error computing unit 275a-4. The adder 275a-1 sequentially selects target pixels from among pixels constituting the scan data within a line targeted for the error diffusion process (hereinafter also referred to as the "current line"), adds peripheral error data calculated from the error data in pixels surrounding the target pixel to the multilevel data indicating the gradation level of the color for the target pixel, and generates calibrated data. The comparator 275a-2 compares the calibrated data to threshold data and sets the binary value of the target pixel to a "1" when the calibrated data is greater than or equal to the threshold value or a "0" when the calibrated data is less than the threshold value. The comparator 275a-2 also sets error data to the calibrated data when the binary data has been set to "0" and sets the error data to a value obtained by subtracting multilevel data equivalent to a density of 100% from the calibrated data when the binary data has been set to "1". The comparator 275a-2 sets this error data as the error data in the current line corresponding to the target pixel. The error data is obtained for each processed pixel. That is, the error data in the current line includes a plurality of sets of the error data corresponding to pixels in the current line.

The error memory unit 275a-3 functions to store previous-line error data indicating error data set one line before the current line, and previous-previous-line error data indicating error data set two lines prior to the current line. The error memory unit 275a-3 includes a front surface error memory area 275a-31 and a back surface error memory area 275a-32. The front surface error memory area 275a-31 stores previous line error data, previous-previous line error data for the front surface and the back surface error memory area 275a-32 stores previous line error data, previous, previous line error data for the back surface.

The error computing unit 275a-4 acquires error data for peripheral pixels of the target pixel in the previous, previous line and the previous line from the error memory unit 275a-3, acquires current-line error data from the comparator 275a-2, and calculates peripheral error data based on the acquired error data. After completing the error diffusion process for the current line, the error memory 275a-3 (especially, the front surface error memory area 275a-31 or the back surface error memory area 275a-32 corresponding to the process surface) stores the values of the previous line error data as the previous, previous line error data and the error computing unit 275a-4 stores the current-line error data acquired from the comparator 275a-2 as the precious error data in the error memory unit 275a-3 (275a-31 or 375a-32).

Figure 5B:
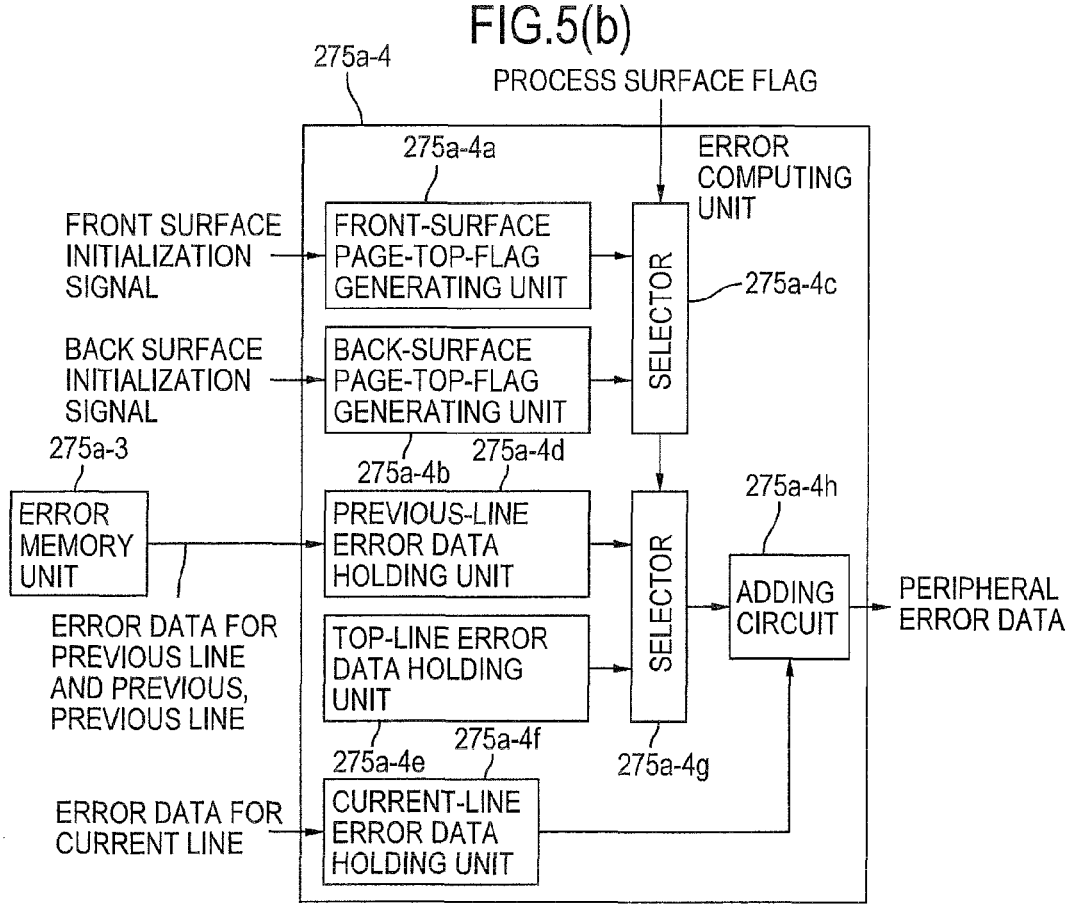

Next, the structure of the error computing unit 275a-4 will be described with reference to the block diagram of FIG. 5(b). The error computing unit 275a-4 has a front-surface page-top-flag generating unit 275a-4a, a back-surface page-top-flag generating unit 275a-4b, a selector 275a-4c, a previous-line error data holding unit 275a-4d, a top-line error data holding unit 275a-4e, a current-line error data holding unit 275a-4f, a selector 275a-4g, and an adding circuit 275a-4h.

When the initialization signal generating circuit 277 (FIG. 3) inputs a front-surface initialization signal into the error computing unit 275a-4, the front-surface page-top-flag generating unit 275a-4a generates a front-surface page-top flag indicating that the error diffusion process will begin on the front surface of a new document sheet. When the initialization signal generating circuit 277 inputs a back-surface initialization signal, the back-surface page-top-flag generating unit 275a-4b generates a back-surface page-top flag indicating that the error diffusion process is to begin on the back surface of a new document sheet. The error computing unit 275a-4 initializes settings for the error diffusion process by generating the front-surface or back-surface page-top flag. After the error diffusion process has been completed for the top line on the corresponding surface of the document sheet, the corresponding page-top-flag generating unit (275a-4a or 275a-4b) deletes the page-top flag (the front-surface or back-surface page-top flag).

The selector 275a-4c functions to output the page-top flag generated in the page-top-flag generating unit (275a-4a or 275a-4b) corresponding to the process-surface flag outputted by the process surface determining circuit 276. The previous-line error data holding unit 275a-4d acquires from the error memory unit 275a-3 (the front surface error memory area 275a-31 or the back surface error memory area 275a-32 corresponding to the process surface) and stores error data for the peripheral pixels around the target pixel in the previous line and the previous, previous line. The top-line error data holding unit 275a-4e functions to store the top-line error data to be used in the error diffusion process on the top line. The error diffusion process requires error data for a previous line, and a previous, previous line of the target pixel. The top line error data is used instead of the error data for a previous line and a previous, previous line when the error diffusion process is performed on the scan data for the top line. In the embodiment, the top line error data is predetermined. For example, the top line error data specifies that the value "0" is used as error data for a previous line and a previous, previous line for all pixels in the top line. The current-line error data holding unit 275a-4f functions to store error data in the current line outputted from the comparator 275a-2.

The selector 275a-4g reads error data for the top line from the top-line error data holding unit 275a-4e when the selector 275a-4c has outputted the page-top flag, and reads error data for peripheral pixels (the previous line error data and the previous, previous line error data) from the previous-line error data holding unit 275a-4d when the selector 275a-4c has not outputted the page-top flag. The selector 275a-4g subsequently outputs the error data read above.

The adding circuit 275a-4h calculates peripheral error data for diffusing the error among the target pixel and its peripheral pixels based on the error data outputted by the selector 275a-4g and the current-line error data stored in the current-line error data holding unit 275a-4f.

Description of the Operations

Next, the operations of the image-reading unit 200 and the like when the image-reader 10 is scanning both surfaces of an document sheet will be described.

(1) Overview of the Operations

First, an overview of operations performed by the image-reading unit 200 and the like during a scanning operation will be described with reference to the timing chart in FIG. 6). In this example, the image-reader 10 continuously scans both surfaces of a plurality of document sheets conveyed consecutively by the conveying unit 100.

When the image-reader 10 is instructed to begin scanning both surfaces on a plurality of document sheets placed in the feeding tray 110, in S1 the image-reader 10 initializes the back-surface read-controlling circuit 250, the front-surface read-controlling circuit 255, and the image-processing circuit 270.

After the conveying unit 100 begins conveying the first sheet of the document sheet, the image-reader 10 determines whether the leading edge of the sheet has reached the upstream reading position P1 based on detection results from the RB sensor 320. When the leading edge of the sheet has reached the upstream reading position P1, in S2 the CPU 600 activates the back-surface read-controlling circuit 250 to begin reading images from the back surface of the document sheet. In response, the image-processing circuit 270 begins processes to read scan data corresponding to the back surface of the first document sheet from the back surface line buffer 261 and to process the scanned image.

When the CPU 600 determines that the leading edge of the first document sheet has reached the downstream reading position P2 based on detection results by the R sensor 330, in S3 the CPU 600 controls activates the front-surface read-controlling circuit 255 to begin scanning images from the front surface of the same document sheet. In response, the image-processing circuit 270 begins reading scan data corresponding to the front surface of the first document sheet and processing the scanned image. Hereafter, the image-processing circuit 270 performs the reading process and the image processes for the back surface of the first sheet in parallel with the reading process and the image processes for the front surface of the same sheet.

When the CPU 600 determines that the trailing edge of the first sheet has passed the upstream reading position P1 based on detection results from the RB sensor 320 and that the image processes are performed on the scan data for all of the lines of the backside surface of the first sheet, in S4 the CPU 600 halts the back-surface read-controlling circuit 250, thereby halting the scanning operation for the back surface of the document sheet. At the same time, the CPU 600 controls the image-reader 10 to halt the reading process and image processes by the image-processing circuit 270 for the back surface of the first sheet, after which the image-processing circuit 270 continues to perform the reading process and the image processes only on the front surface of the first sheet.

When the CPU 600 determines that a second document sheet is being conveyed based on detection results by the F sensor 310, in S5 the CPU 600 controls the initialization signal generating circuit 277 of the image-processing circuit 270 to output a back-surface initialization signal to the image data reading unit 271, the binarization process unit 275, and the back surface line counter 276b of the process surface determining circuit 276. The initialization signal has the effect of initializing the back-surface sub scanning position data in the image data reading unit 271 (the back surface sub scanning position storage unit 271d) to specify the top line of the scan data, generating a back-surface page-top flag in the binarization process unit 275, and initializing the back surface line counter 276b to "0".

When the CPU 600 determines that the leading edge of the second sheet has reached the upstream reading position P1 based on the detection results from the RB sensor 320, in S6 the CPU 600 reactivates the back-surface read-controlling circuit 250 to begin scanning images from the back surface of the second document sheet. In response, the image-processing circuit 270 begins a reading process and the image processes for the back surface of the second sheet, after which the image-processing circuit 270 performs the reading process and the image processes on the back surface of the second sheet in parallel to the reading process and the image processes performed on the front surface of the first sheet.

When the CPU 600 subsequently determines that the trailing edge of the first document sheet has passed the downstream reading position P2 based on detection results from the R sensor 330 and that the image processes are performed on the scan data for all of the lines of the front side surface of the first sheet, in S7 the CPU 600 halts the front-surface read-controlling circuit 255, thereby halting the scanning process for the front surface of the first sheet. At the same time, the CPU 600 halts the reading process and the image processes performed by the image-processing circuit 270 on the front surface of the first document sheet, after which the image-processing circuit 270 continues to perform the reading process and the image processes only on the back surface of the second document sheet.

Next, in S8 the CPU 600 controls the initialization signal generating circuit 277 to output a front-surface initialization signal to the image data reading unit 271, the binarization process unit 275, and the front surface line counter 276a of the process surface determining circuit 276. This initialization signal has the effect of initializing the front-surface sub scanning position data in the image data reading unit 271 (the back surface sub scanning position storage unit 271d) to specify the top line of the image data generating a front-surface page-top flag in the binarization process unit 275, and initializing the front surface line counter 276a to "0".

When the CPU 600 determines that the leading edge of the second document sheet has passed the downstream reading position P2 based on detection results by the R sensor 330, in S9 the CPU 600 activates the front-surface read-controlling circuit 255 to begin scanning images from the front surface of the second sheet. In response, the image-processing circuit 270 begins a reading process and image processes for the front surface of the second document sheet, after which the image-processing circuit 270 performs the reading process and the image processes on both surfaces of the second sheet simultaneously.

When the CPU 600 determines that the trailing edge of the second document sheet has passed the upstream reading position P1 based on detection results from the RB sensor 320320 and that the image processes are performed on the scan data for all of the lines of the backside surface of the second sheet, in S10 the CPU 600 halts the back-surface read-controlling circuit 250, thereby halting the scanning operation for the back surface of the second sheet. At the same time, the CPU 600 halts the reading process and the image processes performed by the image-processing circuit 270 on scan data for the back surface of the second document sheet, after which the image-processing circuit 270 continues to perform the reading process and the image processes only on the front surface of the second document sheet.

(2) Detailed Description of the Image-Reading Process

Next, a duplex image-reading process performed by the image-processing circuit 270 and the like when the image-reader 10 continuously scans both surfaces of a plurality of document sheets conveyed sequentially by the conveying unit 100 will be described with reference to the flowchart in FIG. 7. The image-reader 10 begins this process after receiving an instruction to begin scanning both sides of a plurality of document sheets mounted in the feeding tray 110. The CPU 600 overall controls the duplex image-reading process. However, the CPU 600 does not directly perform all of steps of the duplex image-reading process. That is, the CPU 600 controls the image-reading circuit 270. Thus, the image-processing circuit 270 directly performs a part of steps of the duplex image-reading process (S810, S815, S820, S825, and S845) under the supervision of the CPU 600.

Figure 7:
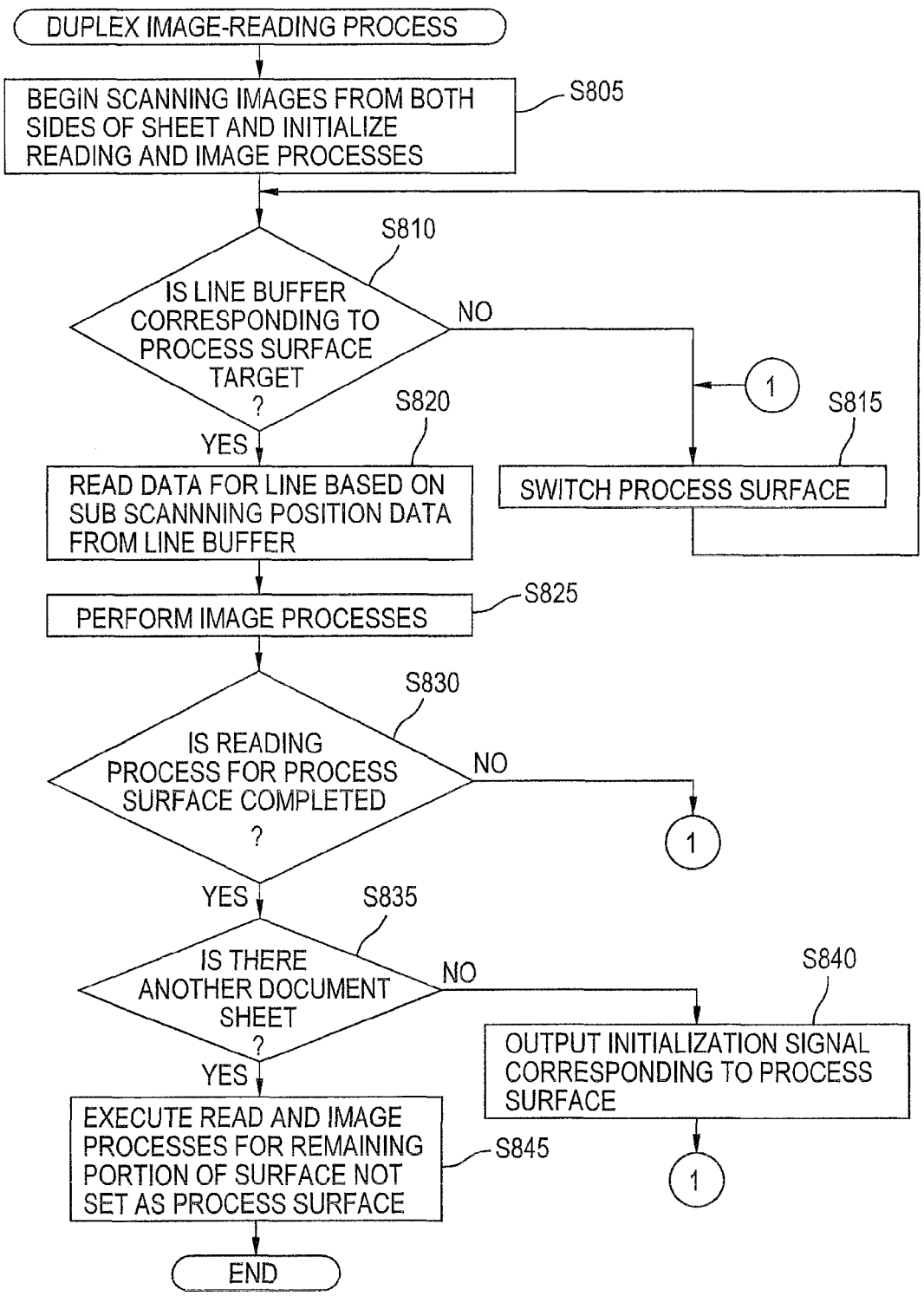
FIG. 7 is a flowchart illustrating a duplex image-reading process.

In S805 of FIG. 7 the CPU 600 controls the conveying unit 100 to begin conveying a sheet of the original, after which the read-controlling circuits begin scanning images from both sides of the sheet. In addition, the CPU 600 controls the initialization signal generating circuit 277 to output a front-surface initialization signal and a back-surface initialization signal to initialize settings in the image-processing circuit 270 for the reading process and the image processes for each respective surface of the document sheet. Specifically, the initialization signals reset the respective front surface line counter 276a and back surface line counter 276b to "0", initialize the sub scanning position data for the respective surface of the document sheet in the image data reading unit 271 (the front surface sub scanning position storage unit 271c and the back surface sub scanning position storage unit 271d), and generate a respective back-surface page-top flag and front-surface page-top flag in the binarization process unit 275.

In S810 the process surface determining circuit 276 determines whether the line buffer corresponding to the process surface indicated by the process surface flag is the target of a reading process. For example, the process surface determining circuit 276 may determine that the line buffer corresponding to the indicated process surface is the target of the reading process when the number of lines indicated by the line counter corresponding to this process surface is at least a predetermined number, or when the number of lines indicated by the line counter corresponding to the process surface is at least a predetermined number and is greater than or equal to the number of lines indicated by the other line counter. In these cases, the process surface determining circuit 276 may determine that the line buffer corresponding to the process surface is the target for the reading process when the corresponding line buffer includes line data set corresponding to a last line of the process surface. That is, the line buffer that stores the line data set corresponding to the last line of the process surface can be read without any requirement. The process advances to S820 when the process surface determining circuit 276 determines that the line buffer is the target of the reading process (S810: YES) and advances to S815 when the line buffer is not the target of the reading process (S810: NO).

In S815 the process surface counter 276c switches the process surface indicated by the process surface flag to the opposite surface, and the process returns to S810. In S820 the scanned data reading unit 271 reads scan data for the prescribed number of lines from the line buffer corresponding to the process surface based on the sub scanning position data corresponding to the process surface.

In S825 the filter process unit 272, the color conversion process unit 273, the recording gamma process unit 274, and the binarization process unit 275 sequentially perform image processes on the scanned data read in S820, and the scanned data resulting from these image processes is stored in the image data memory unit 280.

In S830 the CPU 600 determines whether the reading process and the image processes for the process surface has been completed. Specifically, the CPU 600 determines that the reading process has been completed for the back surface, for example, when all of following first through third conditions are satisfied.

The first condition is that the CPU 600 determines that the trailing edge of the document sheet has passed the upstream reading position P1 based on detection results by the RB sensor 320. That is, if the first condition is satisfied, the CPU 600 determines that the back surface image sensor 210 reads the entire back surface of the document sheet. The second condition is that the CPU 600 receives, from the binarization process unit 275 via the process surface determining unit 255, a one-line end signal with respect to the scanned data to which the units 272-275 performs image processes in current step S825. The third condition is that the line counter (276a or 276b) corresponding to the process surface specifies "0". In other words, if the second and third conditions are satisfied, the CPU 600 determines that the image processes for all of the lines of the process surface are complete.

The CPU 600 determines that the reading process has been completed for the front surface when all of the second and third conditions and the following fourth condition are satisfied. That is, the fourth condition is that the trailing edge of the sheet has passed the downstream reading position P2 based on detection results by the R sensor 330. The CPU 600 advances to S835 upon reaching a positive determination (S830: YES). The CPU 600 returns to S815 upon reaching a negative determination (S830: NO).

In S835 the CPU 600 determines whether there is another document sheet to be scanned. Specifically, the CPU 600 determines that there is another document sheet to scan when the process surface is set to the back surface and the F sensor 310 and/or the RB sensor 320 have detected a conveyed sheet. The CPU 600 also determines that there is another document sheet to scan when the process surface is set to the front surface and the RB sensor 320 and/or the R sensor 330 have detected a conveyed sheet. The CPU 600 advances to S840 upon reaching a positive determination (S835: YES) and advances to S845 upon reaching a negative determination (S835: NO).

In S840 the CPU 600 controls the initialization signal generating circuit 277 to output an initialization signal corresponding to the process surface. The initialization signal resets the line counter for the process surface to "0", initializes the sub scanning position data for the process surface in the image data reading unit 271, and generates a page-top flag corresponding to the process surface in the binarization process unit 275. Subsequently, the CPU 600 returns to S810.

In S845 the image-processing circuit 270 reads the image for the remaining portion of the surface not set as the process surface and executes the read process and image processes on this image. Once these processes are completed, the current duplex scanning process of FIG. 7 is completed.

According to the embodiment described above, after completing the image process for a first surface of an document sheet, the image-reader 10 initializes settings for the reading process and image processes on the same surface in the image-processing circuit 270, making it possible to begin image processing for the first surface of the next document sheet being conveyed. Accordingly, the image-reader 10 can begin reading images from the first surface of the next document sheet without having to wait until the image processes and the like are completed for the second surface of the current document sheet. That is, the image-reader 10 can begin reading images from the next document sheet before the trailing edge of the current sheet has passed the downstream reading position P2. Therefore, when the image-reader 10 is continuously scanning both surfaces of a plurality of document sheets conveyed automatically, it is possible to set the amount of gap between conveyed sheets shorter than the distance between the upstream and downstream reading position P2s, enabling the image-reader 10 to read images from both surfaces of a plurality of document sheets more quickly.

Variations of the Embodiment

While the invention has been described in detail with reference to the embodiment thereof, it would be apparent to those skilled in the art that various changes and modifications may be made therein without departing from the spirit of the invention.

(1) When the image-reader 10 according to the embodiment described above detects the end of a reading process in the image-processing circuit 270 for a process surface, the image-processing circuit 270 initializes settings for a reading process and image processes corresponding to the same process surface when there is another document sheet being conveyed. However, the image-reader 10 may be configured to initialize settings for reading and image processes on the same process surface upon detecting the end of a reading process for the process surface, regardless of whether there exists another document sheet being conveyed. An image-reader 10 having this configuration obtains the same effects as those described in the embodiment.

(2) In the embodiment described above, the image-reader 10 determines whether image reading for each surface of an document sheet has been completed based on detection results by the F sensor 310, the RB sensor 320, and the R sensor 330. However, the image-reader 10 may instead determine that image reading has been completed for a surface based on the scan data. This method of determination can achieve the same effects as those described in the embodiment.

What is claimed is:

1. An image-reader comprising:
  a conveyance unit that is configured to sequentially convey a plurality of document sheets at a predetermined interval along a conveying path, each document sheet including a first surface and a second surface;
  a first reading unit that is configured to read an image on a first surface of a document sheet being conveyed on the conveying path and output first image data corresponding to the read image of the first surface;
  a second reading unit disposed on the conveying path apart from the first image reading unit, the second image reading unit being configured to read an image on a second surface of the document sheet being conveyed on the conveying path and output second image data corresponding to the read image of the second surface;
  a storing unit that is configured to store the first image data output from the first reading unit and the second image data output from the second reading unit;
  an image process circuit that is configured to acquire at least one of a part of the first image data and a part of the second image data from the storing unit, and to perform an image process on the image data acquired from the storing unit, the image process circuit having a first setting corresponding to setting of the image process circuit for the first surface and a second setting corresponding to setting of the image process for the second surface; and
  an initialization instruction unit, wherein when the image process circuit finishes performing the image process on the first image data, the initialization instruction unit instructs initializing the first setting corresponding to the first image data, and when the image process circuit finishes performing the image process on the second image data, the initialization instruction unit instructs initializing the second setting corresponding to the second image data,
  wherein when the initialization instruction unit instructs initializing the first setting, the image process circuit initializes the first setting and when the initialization instruction unit instructs initializing the second setting, the image process circuit initializes the second setting.

2. The image-reader according to claim 1,
  wherein the first reading unit sequentially reads an image of the first surface in a line basis and sequentially generates a set of first line data corresponding to the read line image as a part of the first image data,
  wherein the second reading unit sequentially reads an image of the second surface in and sequentially generates a set of second line data corresponding to the read line image as a part of the second image data,
  wherein the image process circuit performs the image process in a first line data basis and a second line data basis.

3. The image-reader according to claim 2,
  wherein each of the first image data and the second image data is multiple level image data,
  wherein the image process circuit including:
  an error diffusion process portion that is configured to perform an error diffusion process on first image data and generate first error data, and to perform an error diffusion process on the second image data and generate second error data; and
  a top-line error data storing portion that is configured to store first top-line error data and second top-line error data that are predetermined;
  an error data storing portion that is configured to store the first error data and the second error data generated by the error diffusion process,
  wherein when the initialization instruction unit instructs initializing the first setting to the image process circuit, the error diffusion process portion performs the error diffusion process on a set of first line data corresponding to a top line of the first surface by using the first top-line error data and subsequently performs the error diffusion process on a set of first line data corresponding to a line other than the top line by using the first error data stored in the error data storing unit,
  wherein when the initialization instruction unit instructs initializing the second setting toward the image process circuit, the error diffusion process portion performs the error diffusion process on a set of second line data corresponding to a top of the second surface by using the second top-line error data and subsequently performs the error diffusion process on a set of second line data corresponding to a line other than the top line by using the second error data stored in the error data storing unit.

4. The image-reader according to claim 2,
  wherein the image process circuit including:
  a first position storing portion that is configured to store first position information specifying a position of line of the first surface, the image process circuit acquiring the set of first line data corresponding to the line specified by the first position information, wherein the first position information is updated when the image process circuit acquires the set of first line data; and a second position storing portion that is configured to store second position information specifying a position of line of the second surface, the image process circuit acquiring the set of the second line data corresponding to the line specified by the second position information, wherein the second position information is updated when the image process circuit acquires the set of second line data, wherein when the initialization instruction unit instructs initializing the first setting to the image process circuit, the first position information is initialized to specify a top line, wherein when the initialization instruction unit instructs initializing the second setting to the image process circuit, the second position information is initialized to specify a top line.

5. The image-reader according to claim 2,
wherein the image process circuit includes:
a first line counter that counts number of line corresponding to the set of first line data that is generated by the first reading unit and that is unprocessed by the image process circuit;
a second line counter that counts number of line corresponding to the set of second line data that is generated by the second reading unit and that is unprocessed by the image process circuit;
a process surface determining unit that is configured to determine which of the first surface and the second surface is a process surface based on the numbers of lines indicated by the first line counter and the second line counter, wherein the image process circuit acquires either the set of first line data or the set of second line data corresponding to the process surface from the storing unit, wherein when the initialization instruction unit instructs initializing either one of the first setting and the second setting, either the first line counter or the second line counter that corresponds to a surface corresponding to the first setting or the second setting initializes the number of line.

6. The image-reader according to claim 2, wherein the initialization instruction unit instructs initializing the first setting to the image process circuit when a trailing edge of the document sheet has passed a prescribed position and when the image process finishes performing the image process on all sets of the first line data in the first image data, wherein the initialization instruction unit instructs initializing the second setting toward the image process circuit when a trailing edge of the document sheet has passed another prescribed position and when the image process finishes performing the image process on all sets of second line data in the second image data.

* * * * *